United States Patent
Ito et al.

(10) Patent No.: US 12,415,515 B2
(45) Date of Patent: Sep. 16, 2025

(54) DETERMINING EMOTION OF A DRIVER DURING DRIVING ASSISTANCE

(71) Applicant: TOYOTA JIDOSHA KABUSHIKI KAISHA, Toyota (JP)

(72) Inventors: Hirokazu Ito, Shizuoka-ken (JP); Hiroshi Oyagi, Kyoto (JP); Shinya Shiratori, Susono (JP); Norimi Asahara, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 169 days.

(21) Appl. No.: 18/384,095

(22) Filed: Oct. 26, 2023

(65) Prior Publication Data

US 2024/0140416 A1    May 2, 2024

(30) Foreign Application Priority Data

Oct. 31, 2022    (JP) ................................. 2022-174772

(51) Int. Cl.
  *B60W 30/12*    (2020.01)
  *B60W 30/085*   (2012.01)
  *B60W 30/095*   (2012.01)

(52) U.S. Cl.
  CPC .......... *B60W 30/12* (2013.01); *B60W 30/085* (2013.01); *B60W 30/0956* (2013.01); *B60W 2540/22* (2013.01); *B60W 2540/221* (2020.02); *B60W 2554/80* (2020.02); *B60W 2555/00* (2020.02)

(58) Field of Classification Search
  None
  See application file for complete search history.

(56) References Cited

U.S. PATENT DOCUMENTS

| | | | |
|---|---|---|---|
| 2020/0255007 A1 | 8/2020 | Tsuji et al. | |
| 2020/0377107 A1* | 12/2020 | Fung | B60W 40/08 |
| 2022/0017082 A1 | 1/2022 | Sakashita et al. | |

FOREIGN PATENT DOCUMENTS

| | | | |
|---|---|---|---|
| JP | 2006-321299 A | | 11/2006 |
| JP | 2018008575 A | * | 1/2018 |
| JP | 2020-128167 A | | 8/2020 |
| JP | 2020-164108 A | | 10/2020 |
| JP | 2021-113041 A | | 8/2021 |

* cited by examiner

*Primary Examiner* — Christian Chace
*Assistant Examiner* — Shayne M. Gilbertson
(74) *Attorney, Agent, or Firm* — Dinsmore & Shohl LLP

(57) ABSTRACT

A driving support apparatus including a processor, where the processor acquires operation information for an own vehicle by a driver at the time of a driving assistance intervention for keeping a lane of the own vehicle, environmental information including another vehicle around the own vehicle, and biometric information of the driver, estimates emotion of the driver based on the operation information, the environmental information, and the biometric information, estimates control parameters related to an amount of intervention at the time of driving assistance intervention based on the estimation result of emotion of the driver, and controls the own vehicle based on the control parameters.

5 Claims, 3 Drawing Sheets

DETERMINING EMOTION OF A DRIVER DURING DRIVING ASSISTANCE

CROSS-REFERENCE TO RELATED APPLICATION(S)

The present application claims priority to and incorporates by reference the entire contents of Japanese Patent Application No. 2022-174772 filed in Japan on Oct. 31, 2022.

BACKGROUND

This present disclosure relates to a driving support device.

Japanese Laid-open Patent Publication No. 2006-321299 discloses a technique for controlling the running position of the own vehicle so as to move away from the vehicle of the adjacent lane when the vehicle of the adjacent lane is a position closer than a predetermined.

SUMMARY

There is a need for providing a driving support device capable of performing driving support reflecting the emotion of the driver.

According to an embodiment, a driving support apparatus including a processor, where the processor acquires operation information for an own vehicle by a driver at the time of a driving assistance intervention for keeping a lane of the own vehicle, environmental information including another vehicle around the own vehicle, and biometric information of the driver, estimates emotion of the driver based on the operation information, the environmental information, and the biometric information, estimates control parameters related to an amount of intervention at the time of driving assistance intervention based on the estimation result of emotion of the driver, and controls the own vehicle based on the control parameters.

DETAILED DESCRIPTION

Figure 1:
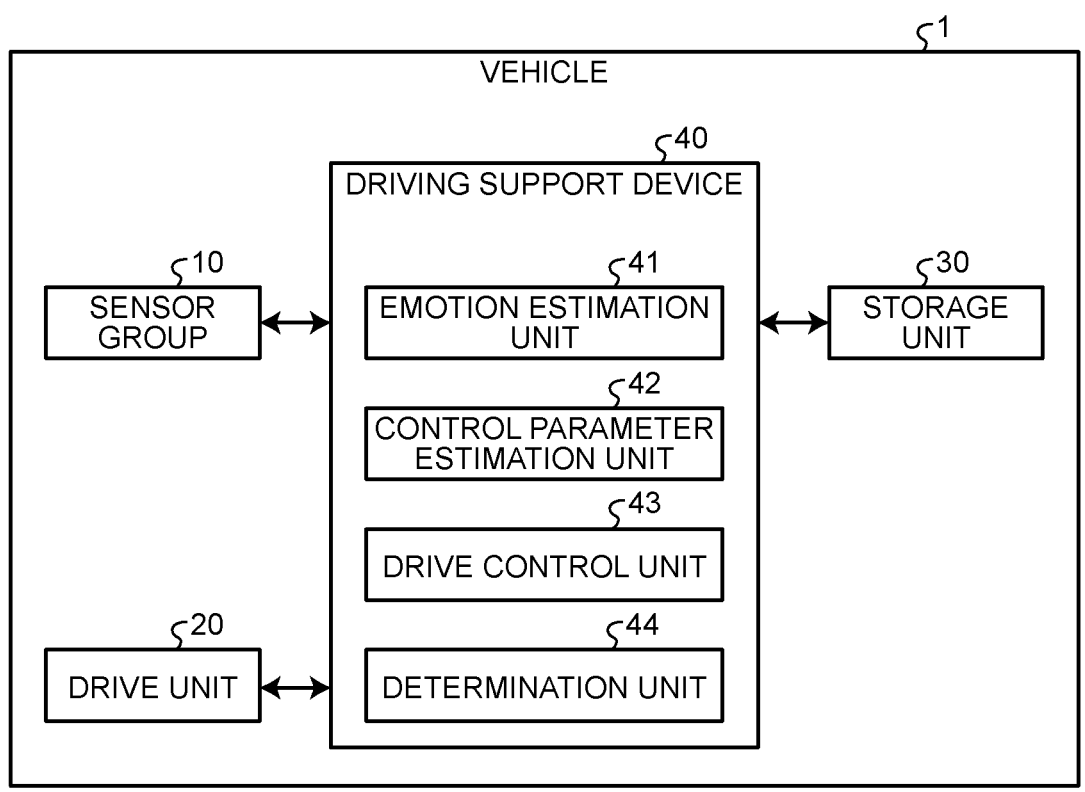
FIG. 1 is a block diagram illustrating a functional configuration of a vehicle according to an embodiment.

In Japanese Laid-open Patent Publication No. 2006-321299, there is a problem in that a driver's emotion is not considered and his/her own vehicle moves to a traveling position which is not intended, and thus he/she may give a fear to the driver.

Hereinafter, a vehicle including a driving support device according to an embodiment of the present disclosure will be described with reference to the drawings. The present disclosure is not limited by the following embodiments. In the following, the same portions will be described with the same reference numerals.

Functional Configuration of a Vehicle

FIG. 1 is a block diagram illustrating a functional configuration of a vehicle according to an embodiment. As the vehicles 1 illustrated in FIG. 1, a Hybrid Electric Vehicle (HEV), a Plug-in Hybrid Electric Vehicle (PHEV), a Battery Electric Vehicle (BEV), and a Fuel Cell Electric Vehicle (FCEV) and the like are assumed. In addition, the vehicle 1 is assumed to be capable of cruise control (Cruise Control) which automatically maintains a constant velocity while following the vehicle ahead at a predetermined inter-vehicle distance or of steering operation support which performs driving support for a driver's steering operation or the like to maintain the lane of the vehicle 1. The vehicle 1 includes a sensor group 10, the drive unit 20, the storage unit 30 and the driving support device 40.

The sensor group 10 is configured by using a temperature sensor, a pulse sensor, an imaging device, a millimeter wave radar, a speed sensor, an acceleration sensor, a gyro sensor, or the like. The Sensor group 10 detects various information of the vehicle 1, and outputs the detection information to the driving support apparatus 40. The detection information includes biometric information of the driver in the vehicle 1, the image information obtained by imaging the driver, the operation information such as handle operation and accelerator operation of the vehicle 1 by the driver, and the environmental information around the vehicle 1. The biological information is the driver's pulse, a presence or absence of perspiration and body temperature, etc. Further, the environmental information includes the road width of the lane in which the vehicle 1 travels and the number of lanes in which the vehicle 1 travels, the distance to the preceding vehicle located around the vehicle 1, the following vehicle, other vehicles and structures such as adjacent vehicles, and the speed of the other vehicle located around the vehicle 1. Here, other vehicles such as preceding vehicles, following vehicles, adjacent vehicles, etc. include, in addition to automobiles, micro mobility such as trucks, motorcycles, bicycles and electric kick boards. The structures also include guardrails, utility poles and traffic lights, etc.

The drive unit 20 is implemented using an engine or a motor or the like. The drive unit 20 accelerates the vehicle 1 by driving under the control of the driving support device 40.

The storage unit 30 is implemented using a Read Only Memory (ROM), a Random Access Memory (RAM), a Solid State Drive (SSD), and a Hard Disk Drive (HDD). The storage unit 30 stores an operating system (Operating System: OS), various programs, various tables and various databases. The storage unit 30 may store the estimation result of the emotion estimation unit 41 and the control parameter estimation unit 42 to be described later. The storage unit 30 may store the machine-learned model (trained model) used in the emotion estimation unit 41 and the control parameter estimation unit 42 to be described later.

The driving support device 40 is implemented using a processor having hardware. The hard disks are, for example, memories, a Central Processing Unit (CPU), a Digital Signal Processor (DSP), a Field-Programmable Gate Array (FPGA) and a Graphics Processing Unit (GPU). The driving support device 40 controls the respective units constituting the vehicle 1. The Driving support device 40 loads the program stored in the storage unit 30 into the work area of the memory and executes the program, and controls each configuration unit and the like through the execution of the program to realize a function that meets a predetermined purpose. The driving support device 40 includes an emotion estimating unit 41, a control parameter estimating unit 42, a drive control unit 43, and a determination unit 44.

The emotion estimation unit 41 acquires the biometric information of the driver driving the vehicle 1 and estimates the emotion of the driver based on the biometric information. Specifically, the emotion estimation unit 41 estimates the emotion of the driver driving the vehicle 1 based on the learned model or the rule which is previously learned by the machine learning. When the learned model is used in the emotion estimating unit 41, the input data are biometric information, operation information, and environmental information of the driver that are acquired from the sensor group 10. Here, the biological state includes, for example, the heart rate of the driver measured by the sensor group 10, the presence or absence of perspiration, body temperature, expression information and gaze information and the like. The expression information is a numerical value of the degree of coincidence based on the driver's face and a predetermined pattern (e.g., a smile). Also, the driver's emotions are either positive (comfort), normal and negative (unpleasant).

In the first embodiment, the emotion estimation unit 41 outputs the emotion of the driver in three stages, but it is not limited thereto and may be at least two stages of comfort and discomfort. Of course, the emotion estimation unit 41 may output the emotion of the driver in three or more stages, for example, "positive (comfort)", "slightly positive (slightly comfort)", "normal", "slightly negative (slightly discomfort)" and "negative (discomfort)" in five stages. The emotion estimation unit 41 outputs the driver's emotion in three stages, without being limited thereto, for example, may output a numerical value (probability) of the driver's discomfort. Incidentally, the numerical value of the discomfort, for example, indicates a numerical index indicating the comfort or discomfort. Also, the probability of discomfort indicates the probability for a particular emotion indicating comfort or discomfort.

Further, a technique of constructing a learned model used in the emotion estimating unit 41 is not particularly limited, and various machine learning techniques such as a deep learning using a neural network, a support vector machine, a decision tree, a simple Bayes, and a k neighborhood method can be used.

The control parameter estimation unit 42 estimates the control parameter related to the intervention amount at the time of the next driving support intervention based on the emotion of the driver, the operation information, and the environmental information estimated by the emotion estimation unit 41. This control parameter is a parameter for controlling the traveling position of the lane in which the vehicle 1 travels. Specifically, the control parameter is a parameter relating to the intervention amount such as the steering operation amount and the accelerator operation amount at the time of the driving support intervention for the operation by the driver of the vehicle 1. The control parameter estimator 42 estimates the control parameters related to the driver's emotion, the operation information, and the intervention amount at the time of the next driving assistance intervention based on the environmental information, according to the learned model or rule previously learned by the machine learning. When the learned model is used in the control parameter estimation unit 42, the input data is the estimation result of the emotion of the driver, the operation information, and the environment information. Then, the output data is a control parameter related to the amount of intervention at the next driving assistance intervention. For example, the control parameters are a steering operation amount and an accelerator operation amount in the next driving support intervention. Further, a technique of constructing a learned model used in the control parameter estimator 42 is not particularly limited, and various machine learning techniques such as a deep learning using a neural network, a support vector machine, a decision tree, a simple Bayesian, and a k-neighborhood method can be used.

The drive control unit 43, based on the control parameters input from the control parameter estimator 42, by driving the drive unit 20, controls the operation of the vehicle 1. Specifically, the drive control unit 43, by driving the drive unit 20 based on the control parameter input from the control parameter estimator 42, controls the traveling position of the vehicle 1 at the time of the driving support intervention. For example, the driving control unit 43 drives the drive unit 20 based on the control parameter input from the control parameter estimating unit 42, while maintaining the distance between the vehicle 1 (own vehicle) and the other vehicle constant, the vehicle 1 performs lane keeping to travel. In addition, the driving control unit 43 performs the avoiding operation for another vehicle when it is determined that the distance between the vehicle 1 and the other vehicle is within the predetermined distance by the determination unit 44 to be described later, and the estimation result of the emotion of the driver by the emotion estimation unit 41 is determined to be negative by the determination unit 44.

The determination unit 44, based on the environmental information detected by the sensor group 10, determines whether the distance between the vehicle 1 and the other vehicle is within a predetermined distance. Furthermore, the determination unit 44 determines whether the estimation result of the emotion of the driver estimated by the emotion estimation unit 41 is negative.

Outline of Information Flow in Each Part of the Driving Support Device

Figure 2:
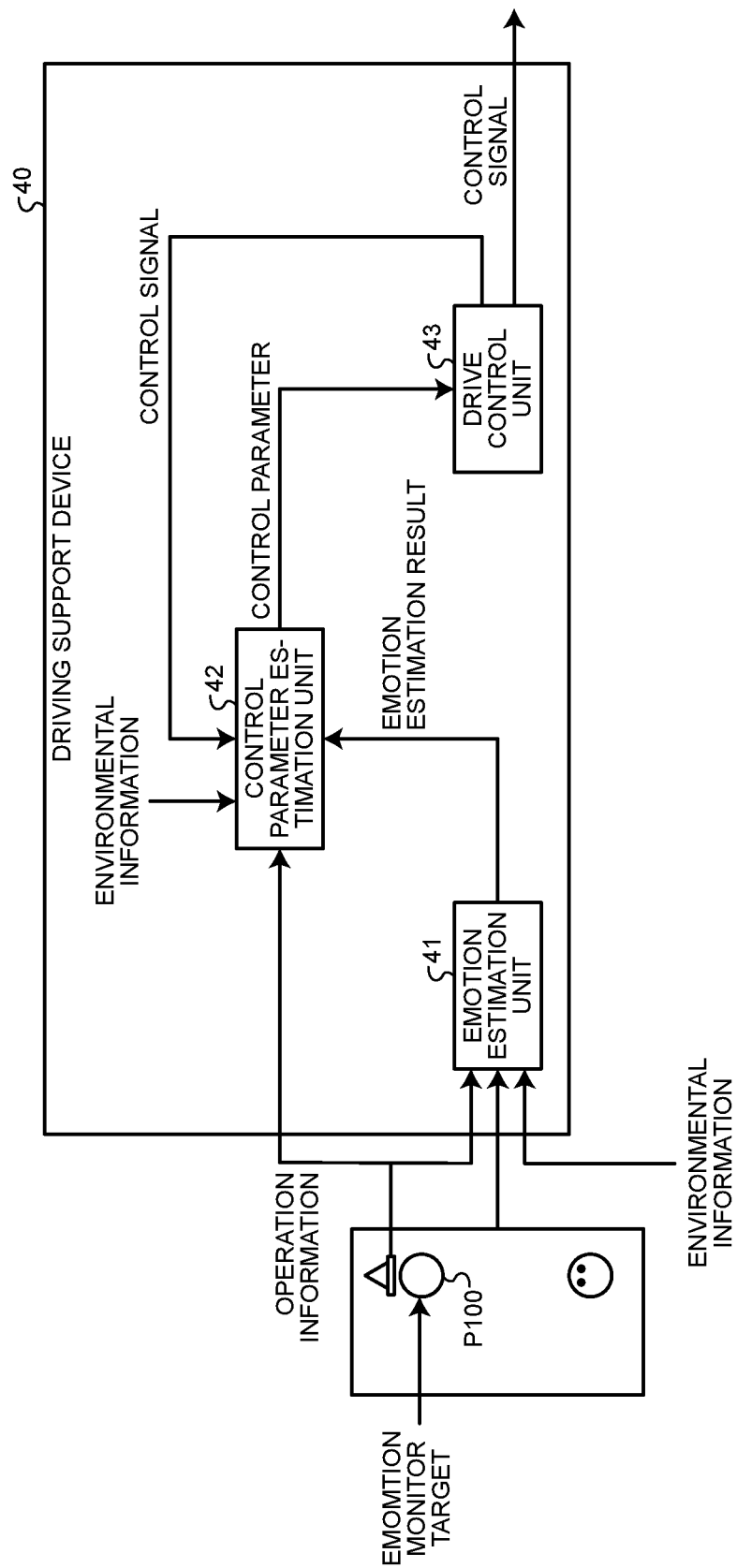
FIG. 2 is a diagram schematically illustrating an outline of the flow of information in each part of the driving support apparatus according to an embodiment.

Next, an outline of the flow of information in each part of the driving support device 40 will be described. FIG. 2 is a diagram schematically showing an outline of the flow of information in each part of the driving support device 40.

As illustrated in FIG. 2, the emotion estimation unit 41 acquires the biometric information of the driver P100, the operating information for the vehicle 1 by the driver P100, and the environmental information of the vehicle 1 from the sensor group 10. Then, the emotion estimation unit 41 estimates the emotion of the driver P100 on the basis of the biological information, the operating information, and the environmental information.

Subsequently, the control parameter estimating unit 42 estimates the control parameter relating to the intervention amount at the time of the driving assistance intervention for performing the lane maintenance in the vehicle 1 based on the estimation result estimated by the emotion estimating unit 41, the operating information of the driver P100 acquired from the sensor group 10, and the environmental information of the vehicle 1. Furthermore, the control parameter estimation unit 42 estimates the control parameter relating to the intervention quantity at the time of the next driving assistance intervention based on the emotion estimation result of the driver P100 estimated by the emotion estimation unit 41, the operation information by the driver P100 acquired from the sensor group 10, the environmental information of the vehicle 1, and the control signal inputted from the driving control unit 43.

Thereafter, the drive control unit 43, based on the control parameters input from the control parameter estimating unit 42, and outputs a control signal for controlling the vehicle 1 to the drive unit 20 and the control parameter estimating unit 42.

Process of Driving Support Device

Figure 3:
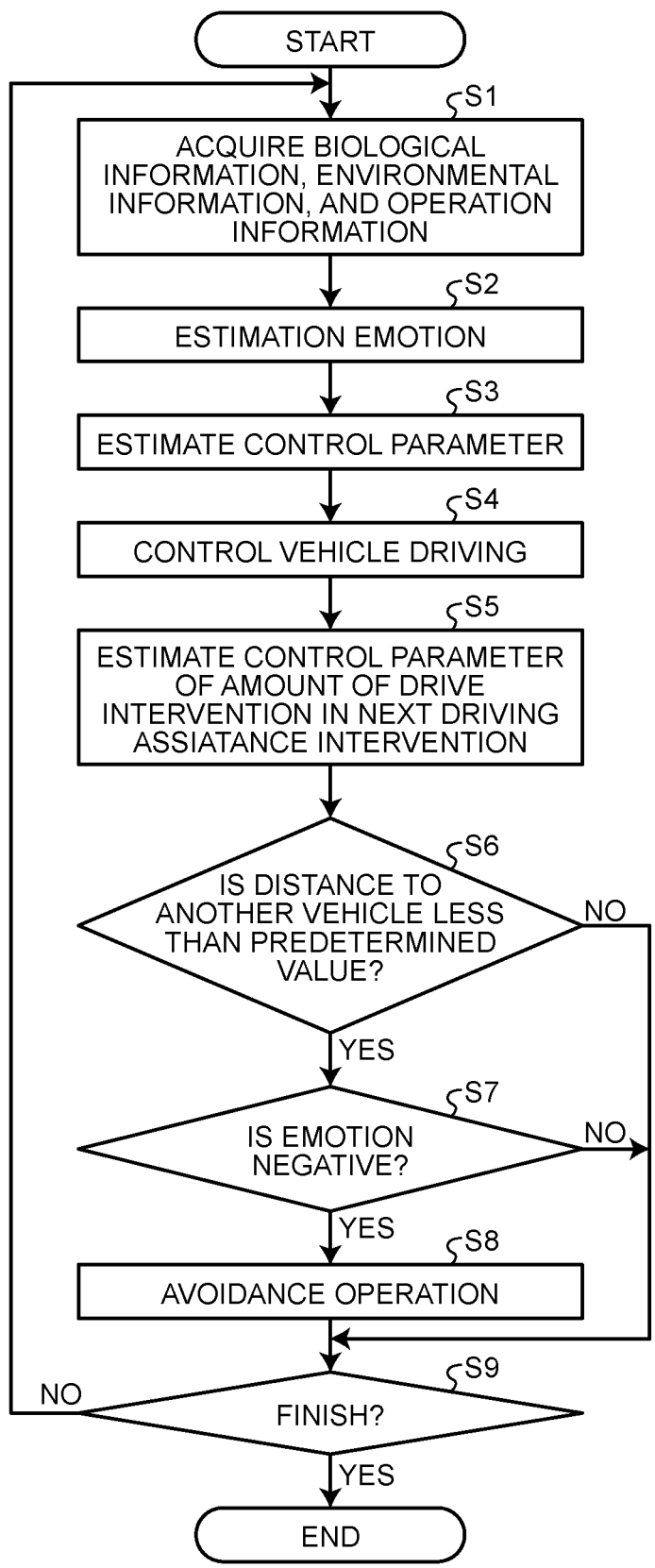
FIG. 3 is a flowchart illustrating an outline of a process performed by the driving support apparatus according to an embodiment.

Next, the processing performed by the driving support device 40 will be described. FIG. 3 is a flowchart illustrating an outline of a process performed by the driving support device 40.

As illustrated in FIG. 3, first, the emotion estimation unit 41 acquires the biological information of the driver P100 in the vehicle 1 from the sensor group 10, the operating information for the vehicle 1 by the driver P100, and the environmental information in the vicinity of the vehicle 1 (step S1).

Subsequently, the emotion estimation unit 41 estimates the emotion of the driver P100 on the basis of the biometric information of the driver P100 acquired from the sensor group 10, the operating information for the vehicle 1 by the driver P100, and the environmental information including other vehicles in the vicinity of the vehicle 1 (step S2).

Thereafter, the control parameter estimation unit 42, the estimation result estimated by the emotion estimation unit 41, the operating information obtained from the sensor group 10, based on the control signal inputted from the environmental information and the drive control unit 43, and estimates the control parameter relating to the intervention amount at the time of the driving support intervention (step S3).

Subsequently, the driving control unit 43 controls the driving of the vehicle 1 at the time of the driving support intervention by outputting a control signal for controlling the vehicle 1 to the drive unit 20 based on the control parameter inputted from the control parameter estimating unit 42 (step S4). Specifically, the drive control unit 43, by driving the drive unit 20 based on the control parameter input from the control parameter estimator 42, controls the traveling position of the vehicle 1 at the time of the driving support intervention. For example, the driving control unit 43 drives the drive unit 20 based on the control parameter input from the control parameter estimating unit 42, while maintaining the distance between the vehicle 1 (own vehicle) and the other vehicle constant, the vehicle 1 performs lane keeping to travel. Furthermore, the drive control unit 43 outputs a control signal to the control parameter estimation unit 42.

Thereafter, the control parameter estimation unit 42, the biometric information of the driver P100 acquired from the sensor group 10, the operating information for the vehicle 1 by the driver P100 and the environmental information including the other vehicle in the vicinity of the vehicle 1 and based on the control signal inputted from the driving control unit 43, estimates the control parameter relating to the intervention quantity of the driving at the time of the next driving support intervention (step S5).

Subsequently, the determination unit 44 determines whether the distance between the other vehicle and the vehicle 1 detected by the sensor group 10 is within a predetermined distance (step S6). Although the determination unit 44 determines whether the distance between the other vehicle and the own vehicle detected by the sensor group 10 is within a predetermined distance, in addition to other vehicles, it may be determined whether the distance between the structure such as a guardrail, a utility pole, and an implanted object and the vehicle 1 is within a predetermined distance. When the distance between the other vehicle and the own vehicle is determined to be within a predetermined distance by the determination unit 44 (step S6: Yes), the driving support device 40, the process proceeds to step S7. In contrast, when the distance between the other vehicle and the own vehicle is determined not to be within the predetermined distance by the determination unit 44 (step S6: No), the driving support device 40, the process proceeds to step S9.

In step S7, the determination unit 44 determines whether the emotion of the driver P100 estimated by the emotion estimation unit 41 is negative (uncomfortable). When the emotion of the driver P100 estimated by the emotion estimating unit 41 is determined to be negative by the determination unit 44 (step S7: Yes), the driving support device 40 proceeds to step S8. In contrast, when the emotion of the driver P100 estimated by the emotion estimating unit 41 by the determination unit 44 is determined not to be negative (step S7: No), the driving support device 40 proceeds to step S9.

In step S9, the drive control unit 43 performs an avoidance operation to avoid the own vehicle to another vehicle by controlling the drive unit 20. After step S7, the driving support device 40 proceeds to step S9.

In step S9, the determination unit 44, based on the detection result inputted from the sensor group 10, it is determined whether the driving operation of the driver P100 is completed by the vehicle 1 is stopped. When it is determined that the driving operation of the driver P100 by the determination unit 44 the vehicle 1 is stopped is completed (step S9: Yes), the driving support device 40 ends the present process. In contrast, when it is determined that the driving operation of the driver P100 by the determination unit 44 the vehicle 1 is stopped is not completed (step S9: No), the driving support device 40 returns to step S1.

According to an embodiment described above, based on the control parameter the drive control unit 43 is inputted from the control parameter estimating unit 42, for controlling the vehicle 1, the driver P100 it is possible to perform the driving support reflecting the emotion.

Further, according to an embodiment, since the control parameter estimating unit 42 estimates the parameter for controlling the traveling position of the lane in which the vehicle 1 travels as the control parameter, the driving support that reflects the emotion of the driver P100 can be performed.

Further, according to an embodiment, the control parameter estimation unit 42 estimates the control parameter relating to the intervention quantity of the driving at the time of the next driving assistance intervention based on the biometric information of the driver P100 acquired from the sensor group 10, the environmental information including the operation information for the vehicle 1 by the driver P100 and the other vehicle in the vicinity of the vehicle 1 and the control signal inputted from the driving control unit 43. Thus, the control parameter estimation unit 42 can estimate the control parameters of the vehicle 1 reflecting the emotion at the time of driving intervention of the driver P100.

Further, according to an embodiment, when the driving control unit 43 determines that the distance between the vehicle 1 and the other vehicle is within the predetermined distance by the determination unit 44, and when the determination unit 44 determines that the estimation result of the emotion of the driver by the emotion estimation unit 41 is negative, the avoidance operation is performed on the other vehicle. Thus, when the driver P100 feels fear for other vehicles performing fueled driving or the like, it is possible to reduce the psychological burden of the driver P100 by performing the driving intervention of the vehicle 1.

Further, according to an embodiment, since the emotion estimation unit 41 acquires the presence or absence of the image information, pulse, body temperature, and perspiration that captured the driver from the sensor group 10 as the biological state, the emotion of the driver P100 can be accurately estimated.

In the embodiment, the emotion estimating unit estimates the emotion of the driver. However, the emotion may be estimated for an occupant who rides on a vehicle without being limited thereto.

Further, in one embodiment, although the driving support device is provided in the vehicle, the function of the driving support device may be realized by one server. Further, each of the emotion estimation unit, the control parameter estimation unit, and the drive control unit constituting the driving support device may be realized by dividing a plurality of servers.

Further, in the driving support apparatus according to an embodiment, the above-described "unit" can be read as "means" or "circuit" or the like. For example, the emotion estimation unit can be read as an emotion estimation unit or an emotion estimation circuit.

Further, the program to be executed by the driving support device according to one embodiment is stored and provided in a computer-readable recording medium such as a CD-ROM, a flexible disk (FD), a CD-R, a Digital Versatile Disk (DVD), a USB medium, or a flash memory in the form of a file data that can be installed or executed.

In the description of the flowchart in the present specification, it has been clarified the relationship before and after the processing between the steps using expressions such as "first," "thereafter," "following," etc., the order of the processing necessary for carrying out the present embodiment is not uniquely defined by their expressions. That is, the order of processing in the flowcharts described herein may be varied to the extent that there is no discrepancy.

Further effects and variations can be readily derived by one skilled in the art. The broader aspects of the present disclosure are not limited to the specific details and representative embodiments expressed and described above. Accordingly, various changes may be made without departing from the spirit or scope of the overall present disclosure defined by the appended claims and their equivalents.

While some of the embodiments of the present application have been described in detail based on the drawings, these are illustrative, and it is possible to implement the present disclosure in other forms which are variously modified and improved based on the knowledge of those skilled in the art, starting from the aspects described in the column of the disclosure of the present disclosure.

According to the present disclosure, there is an effect that it is possible to perform the driving support reflecting the emotion of the driver.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driving support apparatus including a processor, wherein the processor is configured to:
   acquire operation information for an own vehicle by a driver at a time of a driving assistance intervention for keeping a lane of the own vehicle, environmental information including another vehicle around the own vehicle, and biometric information of the driver,
   estimate emotion of the driver based on the operation information, the environmental information, and the biometric information,
   estimate control parameters related to an amount of intervention at the time of driving assistance intervention based on the estimation result of emotion of the driver, and
   control the own vehicle based on the control parameters.

2. The driving support apparatus according to claim 1, wherein the processor is configured to estimate a parameter for controlling a traveling position of a lane in which the own vehicle travels as the control parameter.

3. The driving support apparatus according to claim 2, wherein the processor is configured to estimate the control parameter at a time of a next driving support intervention based on the estimation result of the emotion of the driver, the operation information, and the environment information.

4. The driving support apparatus according to claim 3, wherein the processor is configured to:
   determine whether a distance between the own vehicle and the another vehicle is within a predetermined distance based on the environmental information,
   determine whether the estimated result of emotion of the driver is negative, and
   performs an avoidance operation with respect to the another vehicle when it is determined that the estimated result of emotion of the driver is negative in a case where it is determined that the distance between the own vehicle and the other vehicle is within a predetermined distance.

5. The driving support apparatus according to claim 1, wherein the biometric information includes image information obtained by imaging the driver, pulse, body temperature, and the presence or absence of perspiration.

\* \* \* \* \*